United States Patent Office 3,478,056
Patented Nov. 11, 1969

3,478,056
11-AMINOALKYLATED DIBENZ[b,f] - 1,4-OXAZE-PINES AND DIBENZO-[b,f]-1,4-THIAZEPINES
Jean Schmutz, Bern, Fritz Hunziker, Muri, near Bern, and Franz Martin Kunzle and Jeff Hamish Russel, Bern, Switzerland, assignors to Dr. A. Wander S.A., Bern Switzerland, a corporation of Switzerland
No Drawing. Filed Dec. 6, 1966, Ser. No. 599,377
Claims priority, application Switzerland, Dec. 30, 1965, 18,174/65; Jan. 19, 1966, 694/66; Mar. 28, 1966, 4,464/66; July 29, 1966, 11,033/66
Int. Cl. C07d 93/42, 87/54; A61k 27/00
U.S. Cl. 260—327                         4 Claims

ABSTRACT OF THE DISCLOSURE

The compounds are of the class of dibenz[b,f]-1,4-oxazepines and dibenz[b,f]-1,4-thiazepines which are substituted at the 11-position with an aminoalkyl substituent, e.g., 11-dimethylaminomethyl-dibenz[b,f]-1,4 - oxazepine and 11-(γ-dimethylamino)-propyl-dibenzo[b,f] - 1,4 - thiazepine, and are prepared by several procedures, e.g., by ring closure through intramolecular condensation of an alkanoylamino diphenyl sulfide; such compounds are useful as neuroplegics, neuroleptics, tranquilizers, analgesics and antidepressants.

This invention is generally concerned with new heterocyclic compounds, and more specifically with new 11-aminoalkylated dibenz[b,f]-1,4-oxazepines and dibenzo[b,f]-1,4-thiazepines of the formula:

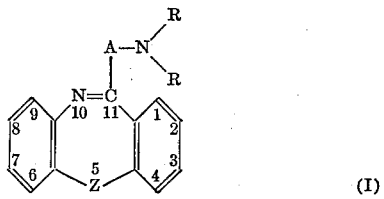

(I)

an acid addition salts thereof. In Formula I, A stands for straight or branched alkylene with at most 5 carbon atoms; the residues R represent alkyl groups each containing not more than 3 carbon atoms; and Z is an oxygen or sulphur atom.

Compounds of Formula I and their acid addition salts are pharmacologically active substances and can be used as active ingredients in pharmaceuticals. They produce an attenuating effect on the central nervous system and, therefore, can be used as neuroplegics, neuroleptics, tranquilizers, analgesics, and also as antidepressants.

The possibility of their use as neuroleptics, neuroplegics and tranquilizers is shown pharmacologically by considerable reduction of motility in mice. This effect is especially marked in compounds of Formula I in which A represents the methylene group, and acid addition salts thereof. The best compounds in this respect are 11-dimethylaminomethyl-dibenz[b,f]-1,4-oxazepine and its acid addition salts.

The analgesic effect is especially pronounced in compounds of Formula I in which A represents the dimethylene group, and acid addition salts thereof, and the best compounds in this respect are 11-(β-dimethylamino)-ethyl-dibenz[b,f]-1,4-oxazepine and its acid addition salts.

The possibility of using compounds of Formula I as antidepressants can pharmacologically be seen, e.g. by a tetrabenazine antagonism, which is especially evident in compounds of Formula I in which A represents the trimethylene group, and acid addition salts thereof. The most effective compounds in this respect are 11-(γ-dimethylamino)-propyl-dibenzo[b,f]-1,4-thiazepine and its acid addition salts.

The compounds of this invention can be administered in the form of pharmaceutical preparations containing, besides the active substance, organic or inorganic solid or liquid carriers suitable for enteral or parenteral administration. The pharmaceutical preparations may be, for example, in the form of tablets, dragees, or solutions for injection, one dosage unit containing from 10 to 80 mg. of active substance, depending on its nature, on the route of administration and on the physician's prescription, the effective daily dose amounting to from 30 to 600 mg. of active substance.

Compounds of Formula I are obtained by ring closure through intramolecular condensation of compounds of the formula:

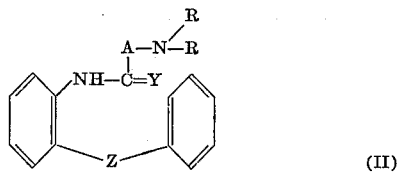

(II)

wherein the residues R, A and Z have the meaning defined above and Y is an oxygen or sulphur atom, or an imino group. The ring closure is preferably carried out by heating the compounds of Formula II in the presence of a suitable condensing agent such as zinc dichloride, aluminum chloride, tin tetrachloride, phosphoric acid, phosphoroxychloride, polyphosphoric acid, mercury(II)chloride and the like, if desired in an inert solvent with suitable boiling point such as benzene or toluene etc. Polyphosphoric acid is an especially suitable condensing agent for effecting ring closure of the acid amides (Formula II; Y=O). For the ring closure of the thioamides (Formula II; Y=S) mercury(II)chloride is especially suitable. The condensation of the amidines (Formula II; Y=NH) is preferably carried out in the presence of polyphosphoric acid or phosphoroxychloride.

The acid amides used as starting materials are obtained, for instance, by reacting 2-amino-diphenyloxide or 2-amino-diphenylsulfide with a basic carboxylic acid halide of the formula

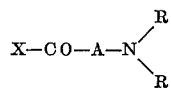

wherein X represents halogen, or, in two steps, by reacting said 2-amino-diphenyloxide or diphenylsulfide first with an aliphatic halocarboxylic acid halide of the formula X—CO—A—X and then with an amine of the formula

The thioamides used as starting materials can be obtained in similar manner by reacting corresponding thio compounds. On the other hand, the thioamides are obtainable by reacting the acid amides with phosphorus pentasulfide whereupon the thioamides produced can directly condense to the desired end products of Formula I.

The amidines used as starting materials are obtainable e.g. by reacting an acid addition salt of 2-amino-diphenyloxide or diphenylsulfide with a basic nitrile of the formula

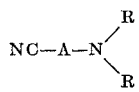

Compounds of Formula I are also obtained by treating reactive esters of alcohols of the formula:

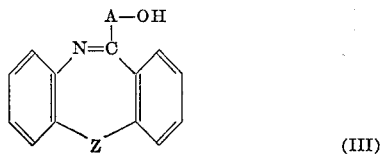

wherein A and Z have the meaning given above, especially the hydrohalic acid esters or p-toluene sulphonic acid esters, with secondary amines of the formula

The reaction is preferably carried out by heating the reactance in an inert solvent such as toluene.

Hydrohalic acid esters of alcohols of Formula III used as starting materials are obtained, for instance, by reacting 2-amino-diphenyloxide or 2-amino-diphenylsulfide with an aliphatic halocarboxylic acid halide of the formula X—CO—A—X and condensing the thus formed product through dehydration. Hydrohalic acid esters of alcohols of Formula III in which A represents the methylene group are also produced by halogenating 11-methyl-dibenz[b,f]-1,4-oxazepine or 11-methyl-dibenzo[b,f] - 1,4-thiazepine respectively.

Compounds of Formula I are also obtained by alkylating primary or secondary amines of the formula:

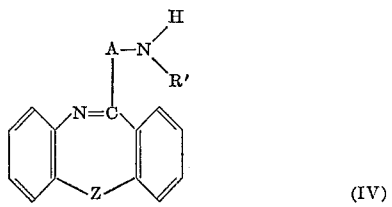

wherein Z and A have the meaning stated earlier and R' stands for a hydrogen atom or an alkyl group with at most 3 carbon atoms, for example by treating them with reactive esters of alcohols of the formula R—OH, or with corresponding aldehydes in the presence of a reducing agent such as formic acid.

Primary or secondary amines of Formula IV are, in turn, obtained by treating reactive esters of alcohols of Formula III with ammonia or with a monoalkylamine with not more than 3 carbon atoms.

Lastly, compounds of Formula I are obtained by dehydrogenating a compound saturated in 10,11-position of the formula:

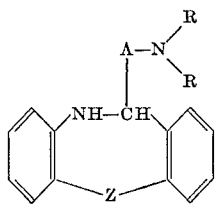

wherein the residues R, A and Z have the meaning defined above, preferably by heating with mercury(II)acetate, chloranil or palladium and the like, if desired in an inert organic solvent such as xylene, decaline, mesithylene etc., or in an aqueous acid such as aqueous acetic acid.

The bases obtained are in many cases crystallizable or can otherwise in most cases be distilled in a high vacuum without decomposition and have a sufficiently strong basicity to react with inorganic and organic acids such as hydrochloric acid, hydrobromic acid, sulphuric acid, nitric acid, phosphoric acid, acetic acid, oxalic acid, malonic acid, succinic acid, maleic acid, malic acid, tartaric acid, toluene sulphonic acid and the like to form salts which are stable in water, in which form the products may also be used.

EXAMPLE 1

2-(γ - chlorobutyryl) - amino - diphenylsulphide (after crystallization from ether/petroleum ether colourless needles of M.P. 54–55° C.) obtained by reacting 2-amino-diphenylsulphide with γ-chlorobutyric acid chloride in the presence of ethyl-dicyclohexylamine is heated under pressure with dimethylamine to form 2-(γ-dimethylamino)-butyrylamino-diphenylsulphide.

16.5 gm. of this starting material are heated with 160 gm. of polyphosphoric acid for 3½ hours at 150–160° C. with stirring, and the reaction mixture is then poured onto ice. The resulting solution is made alkaline with ammonia solution and the base which separates is extracted with ether. 14.1 gm. of 11-(γ-dimethylamino)-propyl-dibenzo [b,f]-1,4-thiazepine are obtained in the form of a yellow oil of boiling point 168–172° C./0.07 mm. Hg. By dissolving this base in acetone and adding an equivalent amount of oxalic acid there is immediately produced the crystalline oxalate. After recrystallization from methanol/ether, the slightly yellowish crystals have a melting point of 173–175° C.

EXAMPLE 2

2-(γ-chlorobutyryl)-amino-diphenyloxide obtained by reacting 2-amino-diphenyloxide with γ-chlorobutyric acid chloride in the presence of ethyl-dicyclohexylamine is heated under pressure with dimethylamine to form 2-(γ-dimethylamino)-butyrylamino-diphenyloxide.

17 gm. of this starting material are treated as indicated in Example 1 with 170 gm. of polyphosphoric acid. 15 gm. of 11-(γ-dimethylamino)-propyl-dibenz[b,f]-1,4-oxazepine are thus obtained in the form of a yellow oil of boiling point 150–160° C./0.07 mm. Hg. The hydrochloride, with is prepared in usual manner, has a melting point of 171–174° C. (from methanol/ether).

EXAMPLE 3

30.3 gm. of 2-(dimethylamino)-acetylamino-diphenyloxide and 455 gm. of polyphosphoric acid are rapidly heated with stirring to a temperature of 150° C., and the reaction mixture is then stirred for further three hours while maintained at this temperature. The reaction mixture is poured while still warm (approx. 70–80° C.) onto ice/water. The acidic solution is shaken twice with ether and the ether phase is made alkaline with concentrated ammonia solution with concomitant cooling. The separated base is immediately extracted with ether. The ether phase is largely evaporated in a rotary evaporator and treated with petroleum ether. The base which separates (M.P. 107–119° C. with decomposition) is dissolved in methanol. The methanolic solution is acidified with alcoholic hydrochloric acid, largely evaporated in a rotary evaporator and treated with ethyl acetate/ether. The salt which separates is crystallized from methanol/ether, whereupon 19.3 gm. of 11-dimethylaminomethyldibenz [b,f]-1,4-oxazepine hydrochloride of melting point 192–198° C. (dec.) are obtained.

EXAMPLE 4

0.525 gm. of 11-bromomethyl-dibenz[b,f]-1,4-oxazepine, obtained by bromination of 11-methyl-dibenz[b,f]-

1,4-oxazepine, and 0.246 gm. of dimethylamine in 30 ml. of toluene are heated for two hours at 100° C. The reaction mixture is kept overnight and filtered. The filtrate is evaporated and the residue is taken up in ether and shaken four times times with 2 N hydrochloric acid. The acid extracts are adjusted to pH 9 with 30% sodium hydroxide solution and shaken five times with ether. The ether extracts are washed with water, dried with sodium sulphate and concentrated by evaporation. A residue of 0.377 gm. of 11 - dimethylaminomethyldibenz[b,f] - 1,4-oxazepine is obtained in the form of a colourless oil. The corresponding hydrochloride produced in usual manner melts after crystallization from methanol/ether at 192–198° C. (dec.). This compound is identical with the product obtained according to Example 3.

(from methanol/ether) are boiled under reflux for 2 hours with 7.25 gm. of chloranil in 200 ml. of xylene. The basic constituents are separated by exhaustive extraction with dilute acetic acid, removed from the extracts with concentrated ammonia solution and taken up in ether. The base is then worked up, distilled and converted into the oxalate as in Example 5, whereupon 4.5 gm. of 11-($\gamma$-dimethylamino)-propyl-dibenzo[b,f]-1,4-thiazepine oxalate of melting point 173–175° C. (from methanol/ether) are obtained. This compound is identical with the products obtained according to Examples 1, 5 and 6.

In similar manner as in the above examples there are obtained from the corresponding starting materials the products given in the following table in which the residues R, A and Z have the meaning defined above. In

TABLE

| Example: | Z | A | $-N\genfrac{}{}{0pt}{}{R}{R}$ | Melting point |
|---|---|---|---|---|
| 8 | $\diagdown S \diagup$ | $-CH_2-$ | $-N(CH_3)_2$ | Hydrochloride, 182–190° C.[1] (from M/E). Base, 110–122° C.[1] (from E/P). |
| 9 | $\diagdown O \diagup$ | $-(CH_2)_2-$ | $-N(CH_3)_2$ | Maleate, 110–116° C.[1] (from A/E). |
| 10 | $\diagdown S \diagup$ | $-(CH_2)_2-$ | $-N(CH_3)_2$ | Maleate, 134–137° C.[1] (from ethyl acetate/M/E). |
| 11 | $\diagdown O \diagup$ | $-(CH_2)_2-$ | $-N(C_2H_5)_2$ | Hydrochloride, >120° C.[1] (from ethyl acetate/M/E). |
| 12 | $\diagdown O \diagup$ | $-\overset{CH_3}{\underset{\phantom{x}}{C}H-}$ | $-N(CH_3)_2$ | Hydrochloride, 175–194° C.[1] (from ethanol/E). |

[1] With decomposition.

EXAMPLE 5

A mixture of 8.3 gm. of 11-($\gamma$-aminopropyl)dibenzo[b,f]-1,4-thiazepine, 14 ml. of 90% formic acid and 11 ml. of 38% formaldehyde is boiled with gentle reflux for 15 hours. The reaction mixture is then concentrated in vacuo. The sirupy residue is dissolved in water and the solution is clarified with active charcoal and rendered alkaline with concentrated ammonia solution. The base which separates is taken up in ether and the ethereal solution is washed with water, dried with sodium sulphate and concentrated by evaporation. The residue obtained is distilled in vacuo, whereupon 8.1 gm. of 11-($\gamma$-dimethylamino)propyl-dibenzo[b,f]-1,4-thiazepine of boiling point 164–167° C./0.03 mm. Hg are obtained in the form of a yellow oil. The oxalate of this base, prepared as in Example 1, melts after crystallization from methanol/ether at 172–175° C. This compound is identical with the product obtained according to Example 1.

EXAMPLE 6

5.2 gm. of 11-($\gamma$-dimethylamino)-propyl-10,11-dihydrodibenzo[b,f]-1,4-thiazepine of melting point 85–87° C. (from methanol/ether) are heated with 13 gm. of mercury(II)acetate in 90 ml. of glacial acetic acid and 270 ml. of water for 2½ hours at 110° C. After cooling the filtered solution is made alkaline with concentrated ammonia solution and the precipitated base is taken up in ether. The base is then worked up, distilled and converted into the oxalate as in Example 5, whereupon 3.2 gm. of 11-($\gamma$-dimethylamino)-propyl-dibenzo[b,f]-1,4-thiazepine oxalate of melting point 173–175° C. (from methanol/ether) are obtained. This oxalate is identical with the products obtained according to Examples 1 and 5.

EXAMPLE 7

6.45 gm. of 11-($\gamma$-dimethylamino)-propyl-10,11-dihydrodibenzo[b,f]-1,4-thiazepine of melting point 85–87° C.

the last column A stands for acetone, E for ether, M for methanol and P for petroleum ether.

Production of tablets

For the manufacture of tablets, the products of this invention can be mixed with lactose and granulated with water, 0.5% sodium alginate or 1% gelatine solution. The dried granulate is compressed into tablets in the presence of about 5% of talcum, 5% of corn starch and 0.1% of magnesium stearate. In this way, there are obtained, e.g. tablets of the following composition:

(A)

|  | Mg. |
|---|---|
| 11-dimethylaminomethyl-dibenz[b,f]-1,4-oxazepine hydrochloride | 20 |
| Lactose | 120 |
| Corn starch | 7.5 |
| Talcum | 7.5 |
| Magnesium stearate | 0.15 |

These 155 mg. tablets can be administered orally in a dosage of 1 to 10 tablets per day in the treatment of patients suffering from psychic or psychotic excitement.

(B)

|  | Mg. |
|---|---|
| 11-($\beta$-dimethylamino)-ethyl-dibenz[b,f]-1,4-oxazepine maleate | 20 |
| Lactose | 120 |
| Corn starch | 7.5 |
| Talcum | 7.5 |
| Magnesium stearate | 0.15 |

These 155 mg. tablets can be administered orally in a dosage of 1 to 10 tablets per day in the treatment of patients suffering from conditions of pain in general and especially in conditions of pain in which a concomitant calming or tranquilizing effect is desirable.

(C)

| | Mg. |
|---|---|
| 11-(γ - dimethylamino) - propyl - dibenzo[b,f]-1,4-thiazepine oxalate | 40 |
| Lactose | 140 |
| Corn starch | 10 |
| Talcum | 10 |
| Magnesium stearate | 0.2 |

These 200 mg. tablets can be administered orally in a dosage of 2 to 15 tablets per day in the treatment of patients suffering from states of mental depression.

We claim:

1. A compound selected from the class consisting of: (A) 11-aminoalkylated dibenz[b,f]-1,4-oxazepines and dibenzo[b,f]-1,4-thiazepines of the formula

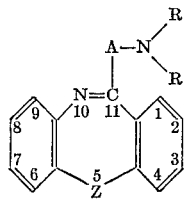

wherein A stands for straight or branched alkylene with at most 5 carbon atoms; the residues R represent alkyl groups each containing not more than 3 carbon atoms; and Z is a member of the class consisting of an oxygen or sulphur atoms; and (B) acid addition salts of (A).

2. 11-dimethylaminomethyl-dibenz[b,f]-1,4 - oxazepine and its acid addition salts.

3. 11-(β-dimethylamino)-ethyl-dibenz[b,f]-1,4 - oxazepine and its acid addition salts.

4. 11-(γ-dimethylamino) - propyl - dibenzo[b,f] - 1,4-thiazepine and its acid addition salts.

References Cited

Hunziker et al.: Helv. Chem. Acta, vol. 49(1), Jan. 22, 1966, pp. 244–9.

JAMES A. PATTEN, Primary Examiner

U.S. Cl. X.R.

260—333, 551, 562; 424—200, 244, 275